Figure 1:
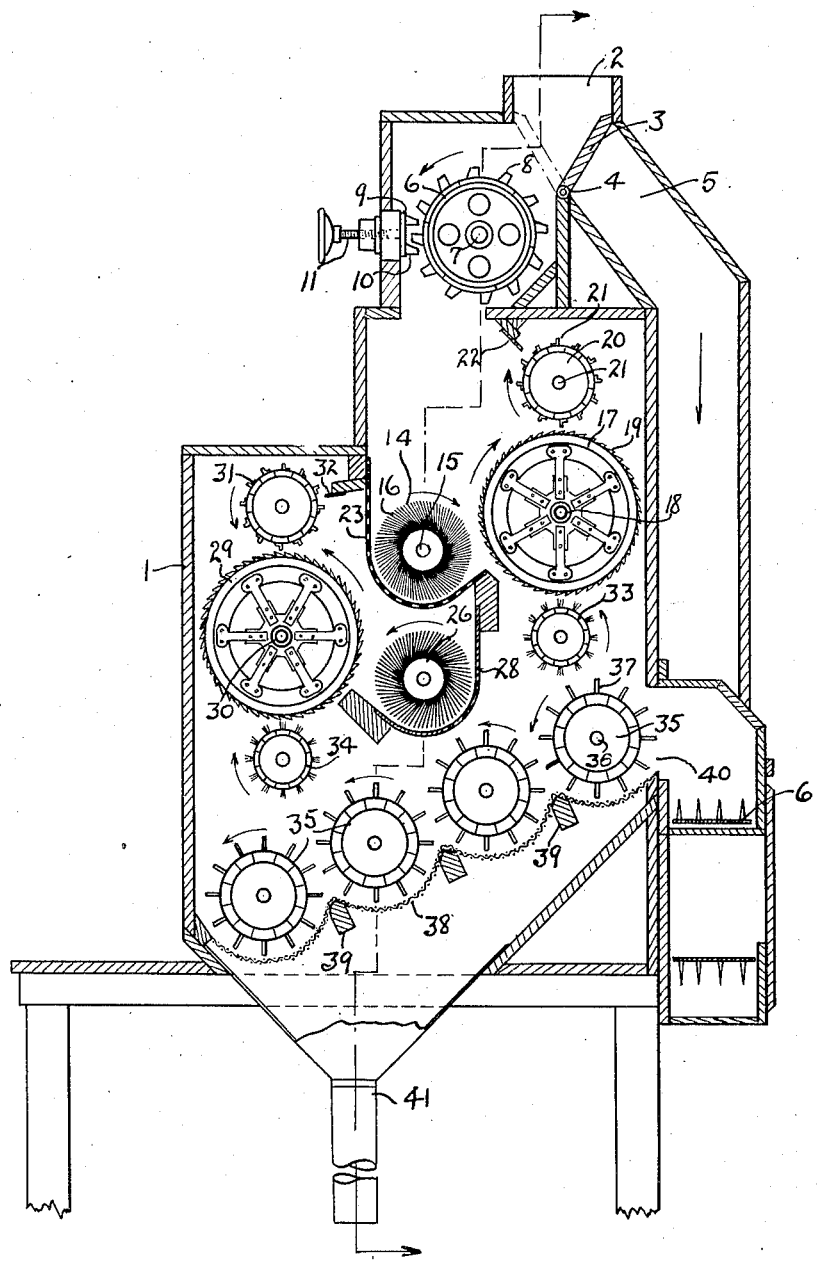

Dec. 1, 1925.

J. A. STREUN

COTTON CLEANER

Filed April 21, 1925

1,563,596

2 Sheets-Sheet 1

John A. Streun, Inventor

By Jesse R. Stone

Attorney

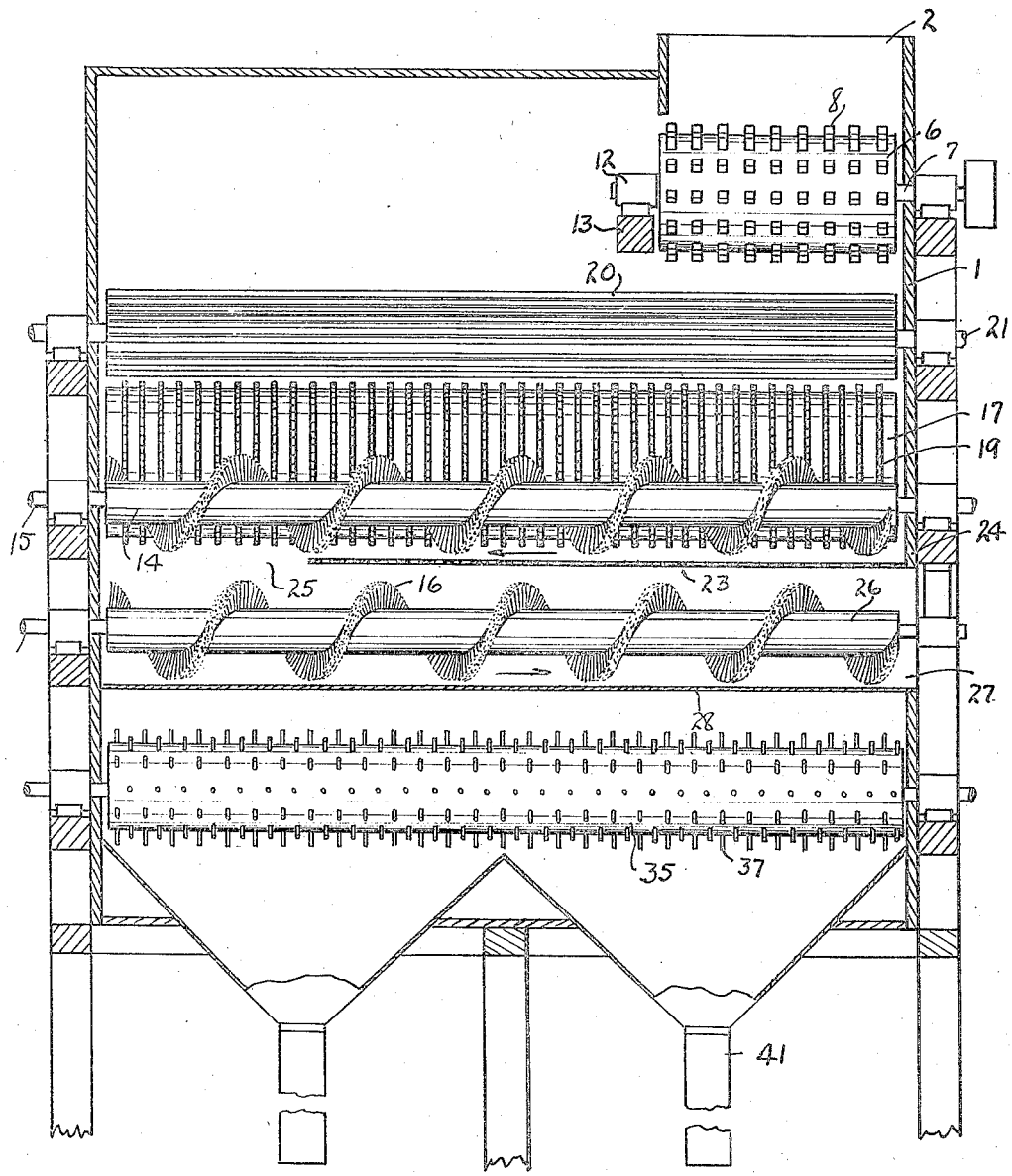

Patented Dec. 1, 1925.

1,563,596

UNITED STATES PATENT OFFICE.

JOHN ARNOLD STREUN, OF SHERMAN, TEXAS.

COTTON CLEANER.

Application filed April 21, 1925. Serial No. 24,744.

*To all whom it may concern:*

Be it known that I, JOHN ARNOLD STREUN, a citizen of the United States, residing at Sherman, Grayson County, Texas, have invented a certain new and useful Improvement in Cotton Cleaners, of which the following is a specification.

My invention relates to an improvement in cleaners for handling dirty and bolly cotton for cleaning purposes before the cotton is fed to the gin.

An object of the invention is to provide a device which will thoroughly eliminate the hulls and chaff from the cotton, and will also agitate and sift out the dirt and other foreign matter from the cotton lint before the cotton is fed to the gin. It is desired to form a unitary cleaning structure which will give the cotton a maximum amount of agitation, and also provide means for eliminating the hulls from the cotton without materially injuring the cotton fibre.

Referring to the drawing herewith, Fig. 1 is a side view of a cleaning device showing the side wall of the housing removed to disclose the rolls and cylinders therein. Fig. 2 is a vertical section on the line 2—2 of Fig. 1. Like numerals of reference are applied to like parts in both the views.

In carrying out my invention, I provide a housing 1 which is shaped to house the operating parts in compact position and to form a support for the shafts upon which the rollers and cylinders are mounted. At the upper part of the housing 1 is a hopper or feeding opening 2 to which the cotton is fed from any ordinary feeding means. The said opening 2, as shown in Fig. 2, is preferably extended only part way across the housing. Below the said opening is a valve 3 hinged at 4 to be moved to direct the cotton either toward the cleaner itself, or toward a chute 5 forming a bypass past the cleaner. When the cotton is fed to said chute, it is directed immediately on to a distributor belt 6 of ordinary construction.

When the valve is moved into the full line position shown in Fig. 1, the cotton will be directed into the cleaner. It will first come in contact with a breaker roll 6. This roll is a cylindrical roll mounted upon a shaft 7 rotatable in the housing. The outer surface is formed with radially projecting teeth 8 which form somewhat coarse projections on the cylinders. On the forward side of the casing adjacent this roll, is a concave or plate 9 having rows of teeth 10 thereon between which the teeth 8 of the roll are adapted to pass. The plate 9 is adjustable toward and away from the roll 6 by means of a hand screw 11 bearing against the plate and serving to move the same in an obvious manner. This roll is adapted to act upon the bolls and burrs entering with the cotton, and to break them up so that the cotton may be recovered from the husks or hulls. As will be noted in Fig. 2, the breaker roll is mounted at its inner end on a bearing 12 supported upon a crossbeam 13 in the housing. The length of the roll 6 is less than that of the other rolls mounted in the casing. The cotton coming from the breaker roll falls upon one end of a feeding roll 14. Said roll is mounted upon a shaft 15 supported in the housing and is adapted to rotate in a clockwise direction, as seen in the drawing. It has a spiral row of rearwardly inclined spikes 16 thereon, whereby the roll acts as a conveyer to carry the cotton longitudinally of the housing and closely adjacent to the saw cylinder 17.

Said saw cylinder is mounted slightly above and to the rear of the feeding roll, and is rotatable with the shaft 18 supported in the housing. Its surface is formed with rows of saw teeth 19 inclined forwardly in the direction of rotation of the cylinder; said cylinder is rotatable in the same direction as the feeding roll 14.

Above the saw cylinder is a knocker roll 20 mounted for rotation in the casing upon a shaft 21. Said roll is cylindrical in shape and has a plurality of radial flights 21 thereon, said flights acting to strike the bolls or husks of the cotton, and prevent them from passing over the top of the saw cylinder 17 with the cotton. Said roll rotates in a clockwise direction, as will be seen in Fig. 1, and the flights 21 will be closely adjacent the teeth 19 of the saw cylinder, thus throwing the hulls backwardly upon the feeding roll.

Mounted on the frame work of the casing closely in front of the knocker roll 20, is a baffle 22. This baffle is a flat plate of flexible material extending the full length of the roll, and mounted so that the outer edge of said baffle projects into close promimity to the flights 21 upon the knocker roll. The baffle acts to prevent hulls or burrs from being carried past the knocker roll on its upper side. It is made flexible so that hard pieces of material which are occasionally carried in with the cotton, will not act to break the apparatus.

Beneath the feeder roll 14 is a trough 23 which conforms closely to the shape of the roll on its lower side and is open on the side adjacent the saw cylinder 17. The said trough is perforated to allow the passage of chaff and dirt therethrough; it is secured at one end to the wall of the housing, as shown at 24 in Fig. 2. It extends beneath the roller to a point spaced somewhat to the opposite side of the housing, leaving an opening shown at 25 in Fig. 2, for the hulls to be discharged onto a lower feeding roller 26.

Said feeding roller 26 is similar in construction to the feeding roll 14, but is adapted to rotate in the opposite direction. The spiral row of teeth 16 thereon thus acts to move the hulls and cotton backwardly along the said feeding roll to be finally discharged through an opening 27 in the housing. The trough 28 below the roll 26 is imperforate and extends from one wall of the housing to the other.

Closely adjacent the feeding roll 26 is a saw cylinder 29 rotatable upon the shaft 30 in the housing. This saw cylinder is similar in all respects to the cylinder 17, except that it is rotatable in a counter clockwise direction. It lies close to the feeding roll 26 and acts to engage the lint upon the cotton still remaining in the hulls after they have been discharged thereon from the upper feeding roll. The cotton will be entirely removed from the hulls by the time the cotton has passed the full length of this saw cylinder, so that the hulls discharged from the housing through the opening 27 will be entirely free from lint.

A knocker roll 31 is mounted immediately above the saw cylinder 29, said knocker roll having a flexible baffle plate 32 mounted closely adjacent thereto, said knocker roll and baffle performing the same function in the same manner as does the roll 20 and baffle 22.

The cotton carried over the two cylinders 17 and 29 is removed from the teeth of the cylinders by means of the brush rolls 33 and 34 mounted immediately below the two cylinders 17 and 29, respectively. The cotton thus wiped or brushed from the cylinders will be thrown downwardly upon a series of picker cylinders 35 arranged in a row inclined upwardly from the forward side of the housing, as shown in Fig. 1.

The picker cylinders 35 are mounted upon shafts 36 rotatable in the sides of the housing, and have radially projecting pins or teeth 37 thereon throughout their length. The teeth are arranged in rows longitudinally of the picker cylinders and are adapted to act upon the cotton to agitate the same and shake out therefrom the chaff and dirt remaining in the cotton after it has passed the saw cylinders. As will be noted, in Fig. 1, these picker rolls rotate and act to carry the cotton down the incline formed by the successive rollers to the forward side of the housing. Immediately below the picker cylinders, of which I have shown four, is a foraminous screen 38. Said screen is mounted at its ends upon the sides of the housing and is curved to conform to the shape of the rollers 35. It is supported between said picker cylinders by cross bars 39. Thus the cotton, after passing over the upper surface of the picker cylinders, will be carried beneath the successive cylinders in an upwardly inclined direction to be discharged through an opening 40 to the distributor belt 6. The dirt and chaff will pass through the screen 38 and be directed downwardly to discharge spouts 41 at the lower side of the housing.

In the operation of this device the cotton fed into the hopper 2 will be received upon the breaker roll which will act to break up the bolls and loosen up the cotton which will be discharged downwardly on to the feeding roll 14 at one end thereof. This roll, rotating in a righthand direction, will carry the cotton along the face of the saw cylinder 17 which will engage the lint of the cotton and carry the cotton, together with the seed, away from the feeding roll and discharge it on to the brush roll 33. Hulls adhering to the cotton will be thrown back on to the feeding roll by the knocker roll 20. No hulls or burrs will be allowed to pass the knocker roll through the action of the baffle 22, as previously described. Cotton hulls thus acted upon by the saw cylinder 17 will be discharged on to the feeding roll 26, and will be carried backwardly along the surface of the saw cylinder 29 to be again acted upon by the saw cylinder to remove the lint therefrom, thus the cotton hulls will be acted upon twice by the saw cylinders 17 and 29 to entirely eliminate therefrom the cotton before the hulls are discharged. The picker cylinders are arranged to carry the cotton downwardly along the tops of said cylinders to the lowest of said cylinders and the cotton is then moved upwardly along the screen 38 beneath said cylinders to give a full opportunity for the chaff and dirt to be sifted out of the cotton before it is finally passed to the distributor belt.

The advantages of this construction lie in the efficient and compact arrangement of the cylinders, and rolls, so that the cotton will be thoroughly cleaned and the hulls and burrs eliminated therefrom before the cotton is discharged on to the distributor. The cotton is thereby cleaned, and the value thereof materially increased through the employment of the cleaner. Further advantages of this device will be obvious to those skilled in the art.

What I claim as new and desire to protect by Letters Patent is:

1. In a cotton cleaner, a housing, a breaker roll adjacent one side of said housing, a saw cylinder below said breaker roll, means to feed the cotton longitudinally of said cylinder, a knocker roll above said cylinder, a flexible baffle adjacent the upper periphery of said knocker roll, means to remove the cotton from said cylinder, and a series of picker cylinders being rotatable to carry the cotton over said screen and discharge it from said housing.

2. In a cotton cleaner, a housing, a breaker roll adjacent one side of said housing, a saw cylinder adapted to receive cotton from said breaker roll, means to feed said cotton longitudinally of said cylinder, a knocker roll rotatable adjacent said cylinder to prevent the passage of hulls, a stationary baffle adjacent said knocker roll, means to remove lint from said cylinder, a foraminated screen below said cylinder, and picker cylinders rotatable to brush said cotton over said screen and discharge it from said housing.

3. In a cotton cleaner, a housing, means adjacent the upper end to break up cotton fed thereto, a plurality of saw cylinders below said breaking means, feeder rolls adapted to feed the cotton longitudinally of each cylinder in succession, a knocker roll adjacent each of said cylinders adapted to throw hulls back upon said feeder rolls, baffles adjacent said knocker rolls, and means below said cylinders to receive said cotton and remove the foreign matter therefrom.

4. In a cotton cleaner, a housing, means at the upper end thereof to break up the cotton bolls and deliver the cotton at one side of the housing, saw cylinders, feeder rolls rotatable to move said cotton longitudinally of said saw cylinders, means to oppose the passage of hulls from said rolls past said cylinders, said feeder rolls acting to convey said hulls to the point of discharge from said housing, and means to clean said cotton and discharge it from said housing.

5. In a cotton cleaner, a housing, upper and lower cotton conveyor rolls mounted centrally therein, troughs below said rolls adapted to discharge cotton hulls from the upper to said lower roll and from said lower roll out of said housing, means to remove cotton from said hulls, means to prevent the removal of hulls with said cotton, picker cylinders in said housing to receive the cotton, and an upwardly inclined screen below said picker cylinders across which said cotton is moved from its lower to its upper end for the purpose described.

6. In a cotton cleaner, a rotatable saw cylinder, means to break up the cotton bolls and feed the cotton to said cylinder, a trough adjacent said cylinder, a conveyor feeding roll in said trough adapted to feed the cotton along said cylinder, means to remove the hulls from the cotton caught by said saw cylinder, and throw them back in said trough, picker cylinders below said saw cylinder and a foraminated screen below said picker cylinders.

7. In a cotton cleaner, a housing, opposed parallel saw cylinders mounted for rotation in opposite directions therein, one being slightly higher in said housing than the other, means to deliver cotton to said cylinders, means between said cylinders to feed the cotton longitudinally of said cylinders in succession, means adjacent both said cylinders including a knocker roll and a baffle adjacent thereto, to prevent the passage of hulls by said cylinders, and means below said cylinders to agitate said cotton and sift the dirt therefrom.

8. In a cotton cleaner, a rotatable saw cylinder, means to feed cotton along said cylinder, a knocker roll closely adjacent said cylinder, and rotatable in the same direction, a baffle plate of flexible material closely adjacent said knocker roll on the side away from said cylinder, and means to brush the cotton from said cylinder.

9. In a cotton cleaner, a rotatable saw cylinder, means to feed cotton along said cylinder, means to prevent hulls being carried from said feeding means, whereby said hulls may be eliminated, picker cylinders below said cylinder arranged in a line inclined upwardly toward the discharge chute, and a screen below said picker cylinders to allow the dirt to pass therethrough, as the cotton is moved upwardly along said screen.

In testimony whereof I hereunto affix my signature this 15 day of April A. D. 1925.

JOHN ARNOLD STREUN.